(No Model.) 2 Sheets—Sheet 2.
C. H. SAWYER.
WHEEL SCRAPER.

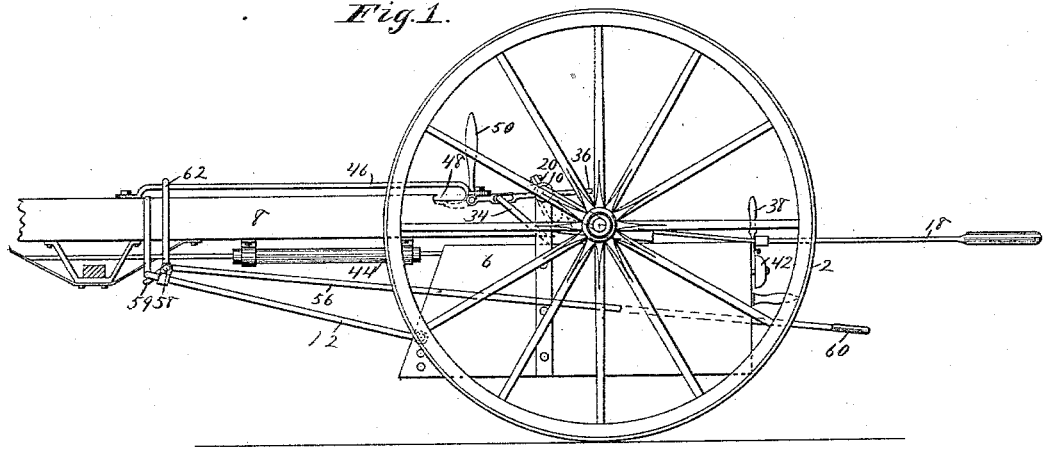

No. 380,354. Patented Apr. 3, 1888.

Witnesses.
S. J. Beardsley
J. Jessen

Inventor.
Charles H. Sawyer.
By Paul Sanford & Merwin atty

UNITED STATES PATENT OFFICE.

CHARLES H. SAWYER, OF MINNEAPOLIS, MINNESOTA, ASSIGNOR OF ONE-HALF TO H. A. SMITH, OF SAME PLACE.

WHEEL=SCRAPER.

SPECIFICATION forming part of Letters Patent No. 380,354, dated April 3, 1888.

Application filed November 30, 1887. Serial No. 256,487. (No model.)

*To all whom it may concern:*

Be it known that I, CHARLES H. SAWYER, of Minneapolis, in the county of Hennepin and State of Minnesota, have invented certain new and useful Improvements in Wheel-Scrapers, of which the following is a specification.

My invention relates to improvements in wheel-scrapers for leveling and excavation purposes; and the object I have in view is to provide an implement of the class described in which the scraper or shovel can be readily and easily lowered to the surface in order to be conveniently filled or loaded, and when filled can be raised again to a convenient height for transportation and the said scraper held in substantially a horizontal or level position throughout this operation. I also provide a means for dumping or unloading the scraper at any desired point.

My invention consists, generally, in the construction and combination, hereinafter described, and particularly pointed out in the claims.

Figure 5:
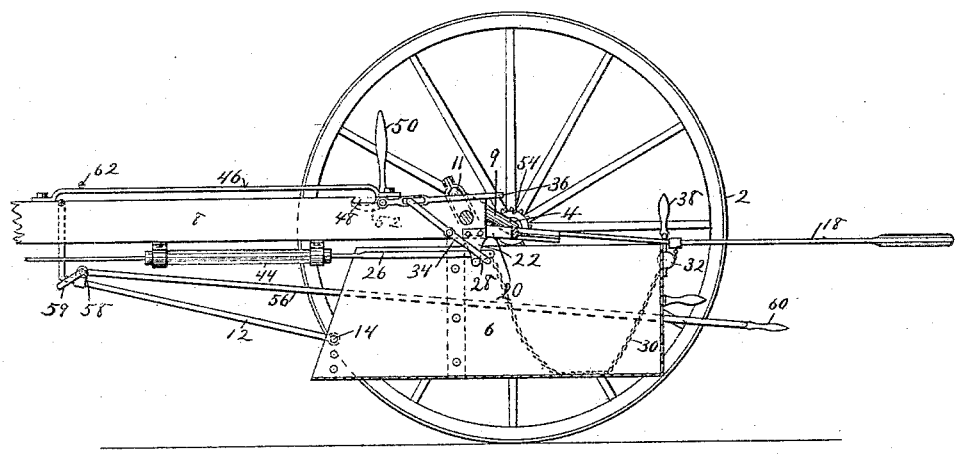
Figure 4:
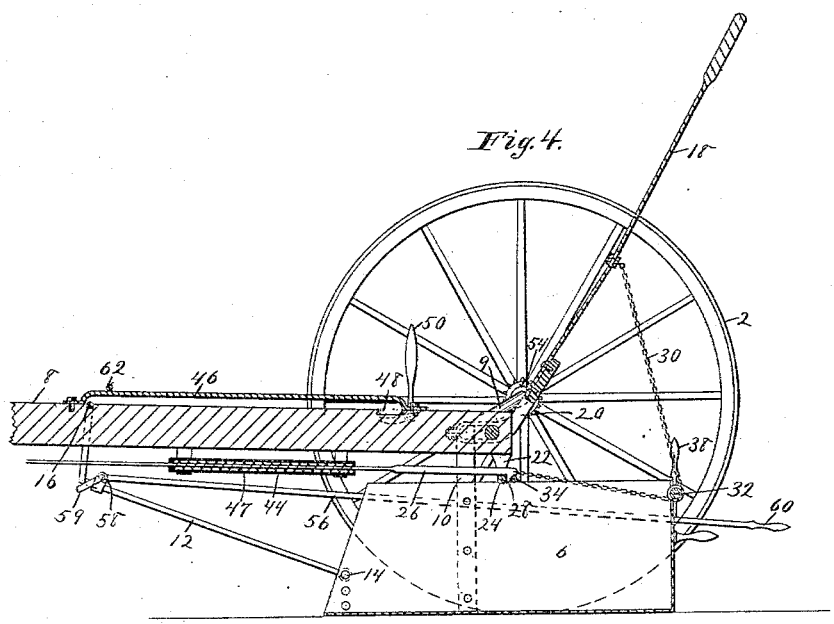

In the drawings, which form a part of this specification, Figure 1 is a side elevation of my improved scraper. Fig. 2 is a plan view of the same. Fig. 3 is a section showing the position of the parts when the scraper is dumped. Fig. 4 is a section of the scraper lowered to receive a load. Fig. 5 is a section showing the scraper raised in position for transportation.

In the drawings, 2 represents the wheels of the scraper mounted upon the axle 4, which supports the pan or shovel 6 and to which is secured the draft pole or tongue 8. The axle 4 is preferably formed with an offset or bend as near to the inner hub of the wheel as it may be conveniently turned. The supporting-straps 10 are loosely secured to the said axle at this offset and extend downward and are secured to the sides of the pan 6. The axle thus constructed forms a crank, 9, the fixed end or axis being at the hub of the wheel and the pan or shovel suspended from the movable end, and as the axle is oscillated the pan will be raised or lowered through the arc described by the offset of the said axle. At the central portion of the axle 4, I prefer to place a second offset or crank, 11, at the point where the tongue 8 is attached to the axle. This offset is preferably not as great as the main offset and extends backward toward the axis, but at a slight angle in advance of the main crank when in its raised position, as shown in Figs. 1 and 5. Any other equivalent device may be used in place of the offset or crank 11. The object of this offset is to give the tongue a backward movement as the pan is lowered, in order to enable me to keep the bottom of the pan level, as hereinafter described.

A bail or yoke, 12, is secured to suitable pivots, 14, upon each side and at the forward portion of the pan and extends upward and over the tongue, and is preferably held in a notch or recess, 16, in its upper surface. The bail is arranged to bear against each side of the tongue and prevent the side motion and take the place of the ordinary lateral braces, and is for the purpose of supporting the pan and holding it in a horizontal position while being loaded.

As the axle is revolved to lower the pan, the offset 11, which is in advance of the stroke, will be thrown to the rear as the downward motion of the crank is continued, and the tongue 8, attached to this offset, will be drawn backward, and with it the yoke 12, thus shortening the distance between the point of suspension of the pan and the fixed end of the yoke or bail, and the nose of the pan will be depressed. As the front end of the tongue is at a fixed height governed by the neck-yoke, the lowering of the end attached to the axle will cause an angularity of the said tongue, and the depression of the nose of the pan, as described, will compensate for this angularity of the tongue and cause the bottom of the pan to retain its level position.

A lever, 18, is preferably secured to the axle 4 by means of a clamp, 20, which embraces the said axle and a portion of the offset 11 upon either side of the tongue, as shown in Fig. 2, so that by operating the lever the axle is turned upon its axis in the hub of the wheels, and the tongue and pan may be raised or lowered, as desired.

I prefer to place flanges or projections 22 upon the tongue, which extend below the under side of the said tongue and are connected by a wrist, 24. These flanges can be made in any convenient manner, and either bolted to the tongue or a cast-metal end or socket may be provided to receive the end of the tongue, in which case the flanges and wrist 24 will be formed in one piece with this socket, a space being left between the under side of the said socket and the wrist for the reception of the snatch-bar 26. This snatch-bar is preferably provided with a hook or catch, 28, at or near its end, which engages the wrist and holds the bar in its backward position. A chain, 30, or other flexible connection is secured to the end of the bar 26 and passes under a sheave or pin 32, attached to the rear portion of the pan, and from this point it passes upward and is secured to the handle 18.

A trip-lever, 34, is pivoted to the tongue with its end extending under the end of the bar 26. The upper end of this lever is preferably attached to a foot-lever, 36, which is also fulcrumed upon the tongue, and extends back a convenient distance to allow it to be easily operated. As the lever 36 is pressed downward, the end of the lever 34 in contact with the bar 26 is forced up, throwing the said bar out of engagement with the wrist, leaving the bar free to be drawn forward.

The bar 26 preferably extends the full length of the tongue, and is provided at its front end with a hook or other suitable connection for the purpose of attaching a team.

When the scraper is lowered to the position shown in Fig. 4, and while it is being filled, the hook of the bar is in engagement with the wrist and the force of both the team on the tongue and the one attached to the snatch-bar will be exerted to draw and fill the pan or shovel. When a sufficient load is obtained, the bar is tripped by the lever 34, as described, and the draft of the team attached to the bar 26 will be exerted through the chain 30 to the lever 18, and this lever will be drawn downward to the position denoted in Fig. 5, and this operation of the said lever partially revolves the axle 4 and raises the pan. A spring-catch, 38, is attached to the back of the pan and arranged to be thrown outward as the lever reaches its lowest position, and a lip on said catch engages the top of the lever and holds it in this position. A handle is provided by which the catch can be released from the lever, when desired. I also prefer to provide a gong or bell, 42, placed at some convenient point on the pan and connected to the spring-catch in such a manner that as the lever is drawn down and the catch thrown out the bell will be sounded to indicate that the pan is raised and secured and that the team can be released from the bar 26.

I prefer to provide the bar 26 with a means for throwing it back to its normal position in engagement with the wrist 24. This may be done as follows: A hollow tube or cylinder, 44, is secured to the under side of the tongue. The rod 26 passes through this cylinder and a collar is secured to the rod and slides freely in the cylinder 44. A spring, 47, is placed in the cylinder around the rod 26, and, bearing against the collar and against the front end of the cylinder as the bar is drawn forward, the spring is compressed in the cylinder, and when this draft is released the expansion of the spring will force the rod back and cause the projection 28 to engage the wrist 24 in position ready for the next load.

I prefer to provide a means for dumping or unloading the pan, which is done as follows: A guard, 46, is secured to the tongue over the recess in which the bail is held and extends back a suitable distance and forms a horizontal guide or way in which the said bail slides after being released from the recess in which it is held. A recess, 48, is preferably placed in the tongue at or near the rear extremity of the said way, and the guard 46 is turned downward and attached to the tongue back of this recess and forms an abutment against which the bail strikes and by which it is guided into the recess 48. A lever, 50, is provided at this point and is fulcrumed at some convenient place upon the tongue, and provided with a finger, 52, which extends underneath the bail when it is in the recess 48, and by operating the handle the finger will be carried up and strike the bail and throw it out of the recess.

A sprocket-wheel, 54, is secured to the hub of each of the wheels and revolves with them. A rack-bar, 56, is arranged at each side of the pan, having upon its upper surface a short rack or tooth section in line with the sprockets 54. These rack-bars are preferably pivoted to the bail 12, and are connected by the cross-shaft 58, so that they can be simultaneously raised and lowered and both be thrown into or out of contact with the sprockets and be supported by lugs 59, which project under the bail. The rack-bar or a rod attached thereto at one side of the pan may be extended back and furnished with a handle, 60, by which the two bars are operated.

An arm, 62, is preferably secured to the cross-shaft 58, and extends upward and over the tongue and forms a bearing upon the upper surface of the guard 46. As the handle 60 is raised the shaft 58 is partially rotated, which throws the arm 62 forward, describing an arc of a circle. The portion of the arm projecting over the guard will strike this guard and be supported at this point. By a further operation of the handle the bail or yoke 12 is raised out of the recess 16, and at the same time the teeth on the rack-bar come in contact with the sprockets 54. The bail 12, to which the rack-bars are pivoted, being free from the recess 16, the revolution of the sprockets engaging said rack-bar will draw them back, and the bail to which these are attached will be forced back on the tongue, and this movement will swing the pan about the shaft to the position shown in Fig. 3. The bail 12 will drop into the recess 48, the rack-bars will be released from the sprocket and be supported by the lugs 59, and the bail will be held in this position until released by the trip-lever 50, when the weight of the pan will cause it to assume its horizontal position.

I claim as my invention—

1. The combination, in a wheeled scraper, with the wheels 2, of the axle provided with the cranks or offsets 9 and with the independent crank 11, the tongue secured to said crank 11, and the pan suspended upon said axle and provided with a bail connecting with said tongue, substantially as and for the purpose set forth.

2. The combination, in a wheeled scraper, with the wheels 2, of the axle provided with the cranks or offsets 9 and with the independent crank 11, the tongue secured to said axle 11, the pan suspended from said axle, the bail pivoted to said pan and connected with said tongue, and the lever 18, secured to said axle and adapted to be fastened to said pan and hold it in an elevated position, substantially as described.

3. The combination, in a wheeled scraper, with the wheels 2, the tongue, and the axle provided with the cranks, of the pan suspended upon said axle and provided with the roll 32, the raising-lever 18, attached to said axle, the snatch-bar 26, and the chain connected with said snatch-bar passing under said roll 32 and connected with said lever 18, substantially as described.

4. The combination, in a wheeled scraper, with the axle and the tongue secured thereto, of the pan suspended from said axle, the raising-lever 18, secured to said axle, the snatch-bar 26, provided with a hook adapted to engage a projection from said tongue, a tripping-lever adapted to disengage said snatch-bar, and a chain connecting said snatch-bar with said raising-lever, substantially as described.

5. The combination, in a wheeled scraper, with the axle and the tongue secured thereto, of the pan suspended from said axle, the wheels 2, provided with the pinions 54, the bail 12, connected with said pan and extending over said tongue, and the rack-bars 56, connecting with said bail and adapted to be raised and brought into engagement with said pinions 54, substantially as described.

6. The combination, in a wheeled scraper, with the tongue provided with the recess 48, the axle, and wheels 2, of the pan suspended from said axle and provided with the bail 12, extending over said tongue and adapted to slide longitudinally thereon, the guard 46, arranged on said tongue, and the lever 50, all substantially as described.

7. The combination, with the scraper suspended upon the axle 4, of the raising-lever 18, the bell 42, the catch 38, the snatch-bar 26, and the chain 30, whereby said bell is sounded when the lever is drawn under the catch, substantially as described.

In testimony whereof I have hereunto set my hand this 22d day of November, 1887.

CHARLES H. SAWYER.

In presence of—
R. H. SANFORD,
A. M. GASKELL.